United States Patent [19]

Britton

[11] 4,256,522
[45] Mar. 17, 1981

[54] FABRICS

[76] Inventor: Arthur Britton, 4 The Sycamores, Bramhope, Leeds LS16 9JR, England

[21] Appl. No.: 916,258

[22] Filed: Jun. 16, 1978

[30] Foreign Application Priority Data

Jun. 18, 1977 [GB] United Kingdom ............... 25552/77

[51] Int. Cl.³ .............................................. B29H 9/04
[52] U.S. Cl. ..................................... 156/178; 156/180; 156/265; 156/519; 156/544
[58] Field of Search ............... 156/117, 157, 159, 177, 156/264–266, 304, 405, 502, 512, 517, 519, 544, 178, 179, 180, 297, 436, 437, 439, 440

[56] References Cited

U.S. PATENT DOCUMENTS

| 1,660,924 | 2/1928 | Hopkinson | 156/178 |
| 3,345,230 | 10/1967 | McClean | 156/439 |
| 3,607,576 | 9/1971 | Phillips | 156/157 |
| 3,694,283 | 9/1972 | Cooper et al. | 156/266 |
| 3,888,713 | 6/1975 | Alderfer | 156/159 |
| 3,947,308 | 3/1976 | Brinkley et al. | 156/405 R |
| 4,083,740 | 4/1978 | Hamanaka | 156/177 |
| 4,087,308 | 5/1978 | Baugher et al. | 156/405 R |

Primary Examiner—John E. Kittle
Attorney, Agent, or Firm—Fleit & Jacobson

[57] ABSTRACT

Disclosed is a method and apparatus for making fabric, especially radial fabric. The disclosure is particularly concerned with radial tire fabric.

The method disclosed, for making a fabric or a ply for a fabric, comprises the steps of continuously laying a succession of discrete assemblies of filamentary material in side-by-side in-line disposition in conjunction with continuous means having a common relationship therewith and adapted to secure the assemblies together to form a continuous length of fabric or ply. In certain important embodiments, the assemblies are of parallel filaments, which filaments lie transversely of the finished fabric or ply but not necessarily at right angles.

Also disclosed is apparatus for carrying out such a method.

15 Claims, 8 Drawing Figures

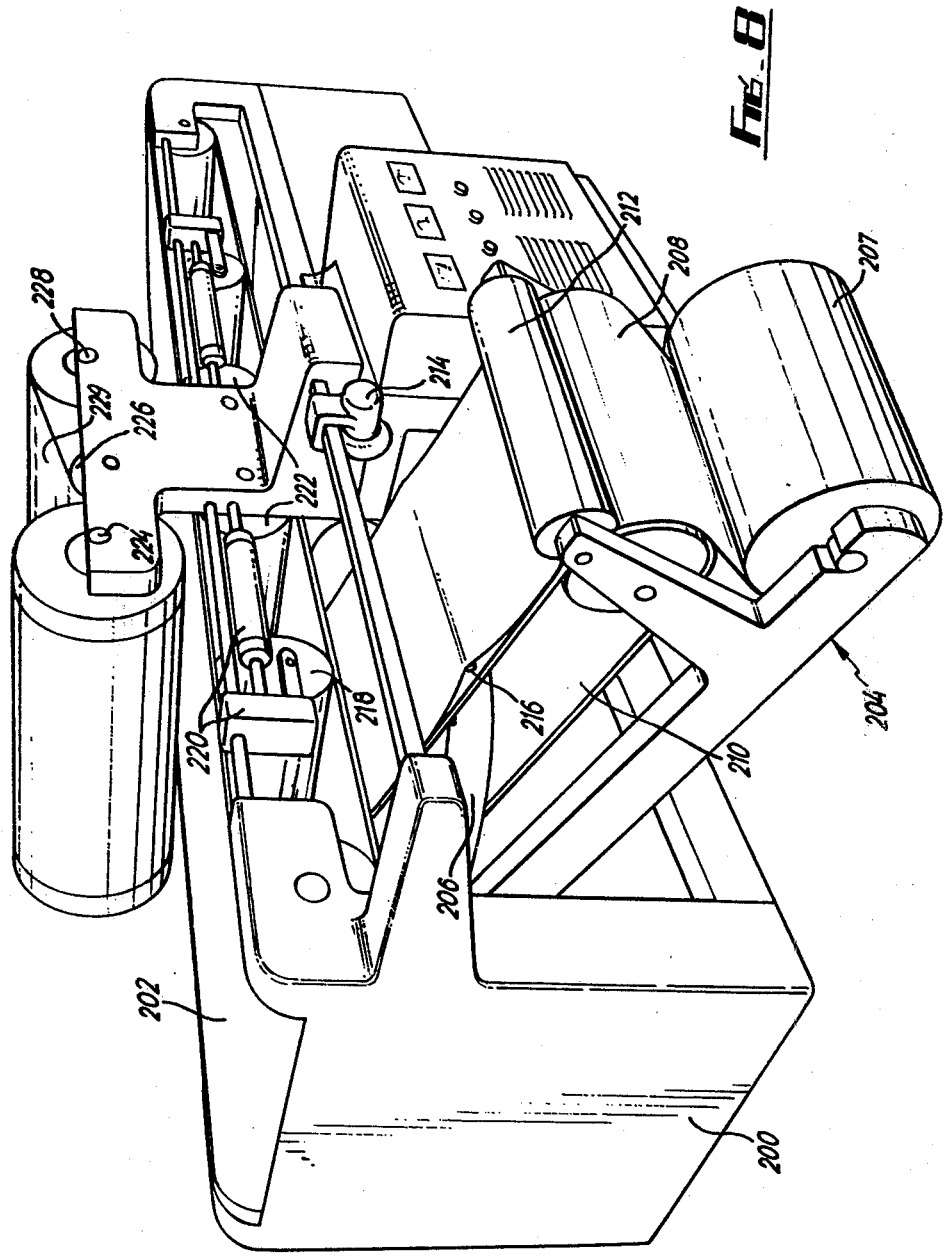

FABRICS

This invention concerns fabric in the piece particularly, but not exclusively, fabric made from filamentary material, the greater part at least of which filamentary material lies transversely of the fabric piece, i.e., extends from side-to-side thereof, not necessarily at right angles to the longitudinal direction of the fabric piece (hereinafter called "radial fabric"). The invention is more particularly concerned with re-inforcing fabric for the main carcass of a radial motor vehicle tyre (hereinafter called "radial tyre fabric"). The term "filamentary material" is intended to include amongst other things, continuous filament yarn, spun yarn, and monofilaments, as well as non-textile such material.

Radial tyre fabric normally consists of multi-ply rubber coated, friction-calendered tyre cord fabric, the filaments (usually rayon or polyester) lying at right angles to the length of the fabric. The rubber coating is of a tacky nature so that good adhesion between the filaments and between the plies is obtained.

In a typical known process for producing radial tyre fabric, the basic tyre cord fabric, say 54 inches in width, with the filaments running longitudinally, is cut transversely at, say, 6 inch intervals and the resulting pieces, measuring 54 inches by 6 inches, are connected together by short lap joints, say approximately 1 inch in extent, to form a 6 inch wide continuous strip. Two or more of such strips are then superimposed to form the final multi-ply radial tyre fabric. The existence of the lap joints is a nuisance since when the multi-ply fabric is formed the lap joints must be carefully spaced so that when the radial tyre fabric is wound around the tyre carcass they are equally spaced. Otherwise the tyre would be out of balance. Furthermore the lap jointing is conventionally performed manually and thus an expensive operation, not to mention the excess material involved. Butt jointing is not regarded as a practical alternative.

British Patent No. 1,388,970 described a machine and a method for automatically forming a reinforced fabric by laying bias-cut strips of reinforced material side-by-side and in line, but if the strips are to be joined to form a continuous fabric then direct lap or butt joints are used: in other words the machine merely automates the known hand process.

The general object of the present invention is to provide an improved method of making fabric, especially radial fabric, and means for carrying out such method. A more specific object is to provide an improved radial tyre fabric.

According to the present invention a method of making a fabric in the piece, or a ply for such a fabric, comprises the steps of continuously laying a succession of discrete assemblies of filamentary material in side-by-side in-line disposition in conjunction with continuous means having a common relationship therewith and adapted to secure the assemblies together to form a continuous length of fabric. In one important such method, for making a radial fabric in the piece, or a ply for such a fabric, the assemblies are of parallel filaments, which filaments lie transversely of the finished fabric or ply.

The method may comprise the further steps of repeatedly and intermittently feeding forward a length of material, which material consists of a coherent web of parallel filaments, by a given amount, and severing said given amount of the length of material so fed, whereby to provide said succession of discrete and like assemblies of parallel filaments and adhering same to an intermittently moving carrier in said side-by-side in-line disposition.

The carrier may consist of more than one element.

The method preferably comprises the further step of pressing each successive assembly of parallel filaments firmly into contact with said carrier.

The length of material may be fed forward at right angles to the direction of movement of said carrier and the assemblies are severed rectilinearly; or it may be fed forward at an angle other than a right angle to the direction of movement of said carrier and the assemblies are severed correspondingly on the bias.

It will usually be desirable for each successive assembly to be placed in abutting side-by-side in-line disposition with the preceding assembly.

The invention also includes fabrics or plies made by such methods.

Also according to the present invention apparatus for making a fabric in the piece comprises means for repeatedly and intermittently feeding forward a length of filamentary material, such as a coherent web of parallel filaments, by a given amount, means for repeatedly and intermittently indexing a moving carrier across the path of said length of material, means for severing said given amount of the length of material so fed to provide a succession of discrete and like assemblies of parallel filaments, all in synchronism, whereby to lay said assemblies in side-by-side in-line disposition on said carrier.

One particular embodiment of such apparatus comprises a feed mechanism having a first support for a roll of material in the form of coherent web of parallel filaments, a second support for material unwound from said first support, and a cutting head traversable above and across said second support, a conveyor system disposed across the path of said feed mechanism and having a support for a roll or carrier in the form of a web, a wind-up, and a platen between said support and said wind-up, an oscillatory transporter for severed lengths of material and movable back and forth between said second support and said platen, and up and down between said second support and said platen, and synchronised drives adapted to advance said material along said second support repeatedly and intermittently, to traverse said cutting head across said second support to sever the so advanced lengths of material to oscillate said transporter so as to carry each successive severed length of material from said second support to beneath said platen and there to pass it into adhering contact with said carrier, and to advance said carrier, repeatedly and intermittently, to receive successive severed lengths of material in side-by-side in-line disposition before causing same to be passed to said wind-up.

Another particular embodiment of such apparatus comprises a feed mechanism having a first support for a roll of material in the form of a coherent web of parallel filaments, a transporter for material unwound from said first support, and a cutting head traversable above and across said transporter, a conveyor system disposed across the path of said feed mechanism and including a carrier in the form of a web, a pressure member for bringing severed lengths of material into contact with said adhesive surface of said web, synchronised drives adapted to operate said transporter repeatedly and intermittently to advance material unwound from said first support beneath said carrier, to traverse said cutting head across said transporter to sever successive lengths of material, and to operate said conveyor system and said pressure member repeatedly and intermittently so as to press each successive severed length of material into adhering contact with the surface of the carrier in side-by-side in-line disposition, and a wind-up for said so disposed lengths of material.

The various aspects of the invention will now be described, by way of example only, with reference to the accompanying drawings, in which, FIG. 1 is a diagram in side view illustrating apparatus for making a continuous length of filamentary material which is suitable for use as the principal component of a radial fabric according to the invention;

FIG. 7 is a perspective view of a machine for making radial fabric, and especially a radial tyre fabric ply according to the invention, and FIG. 8 is a general perspective view of a machine for making a multi-ply fabric according to the invention.

Figure 1:
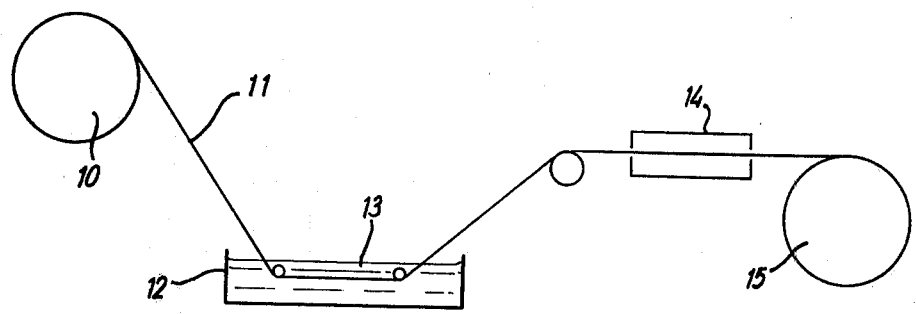

Referring first to FIG. 1 there is provided a roll 10 from which a web 11 of warp yarns can be supplied. These may be conventional tyre cords. The web 11 passes from the roll 10 to a bath 12 containing a matrix-forming material 13 which is preferably latex. The web 11 passes through the bath 12 so as to receive an application of latex, the coating being sufficient to cover the yarns and to cause them to adhere together. After leaving the bath 12, the web 11 passes through a drier 14 in which the latex is caused to set. On leaving the drier 14 the web 11 passes to a take-up roll 15.

The greater the width of the web 11 the greater will be the production rate. In the present instance we prefer to use a web which is 60 inches wide since a web of this width can be conveniently handled during the coating step just described. The yarns will be of rayon or polyester or other type conventionally used for tyre cords.

Figure 2:
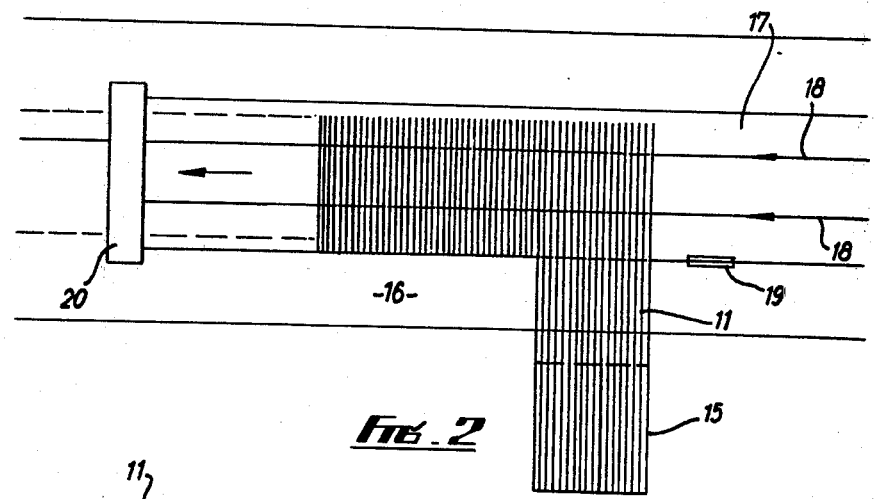
FIG. 2 is a diagram in plan, illustrating the making of a radial tyre fabric ply according to the invention.

The formation of a radial tyre fabric ply from the coated web in the roll 15 will now be described with reference to FIG. 2.

Figure 3:
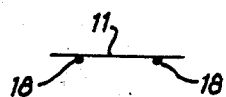
FIGS. 3, 4, 5 and 6 are diagrams in sectional end view of various forms of radial fabric, or plies of radial fabric, according to the invention.

The roll 15 is mounted at one side of a table 16. Along the length of the table is disposed an intermittently-operating conveyor belt 17 carrying two (or more) stringers 18. The stringers 18 may be yarn, strips of latex, or other material suitable for their function, which will shortly be apparent. The roll 15 is adapted to operate so as to eject the latex-coated web 11 transversely across the table onto the conveyor belt 17 at pre-determined intervals, and to a pre-determined extent. A cutter 19 is actuable to sever the end part of the so-ejected web 11 as indicated by the adjacent dashed line so that successive severed pieces come to lie in side-by-side array, moving intermittently, together with the stringers, which they overlie, in the direction of the arrows. Eventually they pass through the nip between a heated pressure roller 20 and a conveyor support roller which causes the pieces and stringers to adhere together, the latter providing a continuous means for securing the pieces together to form a continuous length of fabric of constant thickness. FIG. 3 is a cross-sectional end view of the fabric.

The radial tyre fabric ply just described is of the simplest form and many different forms of radial fabric may be produced, either from combining two or more such basic fabrics or by adopting somewhat more sophisticated methods of production.

For example a radial fabric may consist of two fabrics as illustrated in FIG. 3, laid one on the other with the stringers 18 facing outwardly. Thus laminated the two fabrics are passed through the nip between two heated rollers to secure them together. If desired the stringers 18 may be simultaneously stripped away.

Figure 4:
Figure 5:

In another example the method described with reference to FIG. 2 may be varied, as by, at each intermittent step, feeding a double length of the web beneath the stringers, cutting it off, and then folding the leading half thereof over the stringers, all so that a two-ply radial fabric with sandwiched stringers, is produced (see FIG. 4). Such a fabric may be itself sandwiched between adhering further folded layers of web as shown in FIG. 5.

Figure 6:
Figure 1:
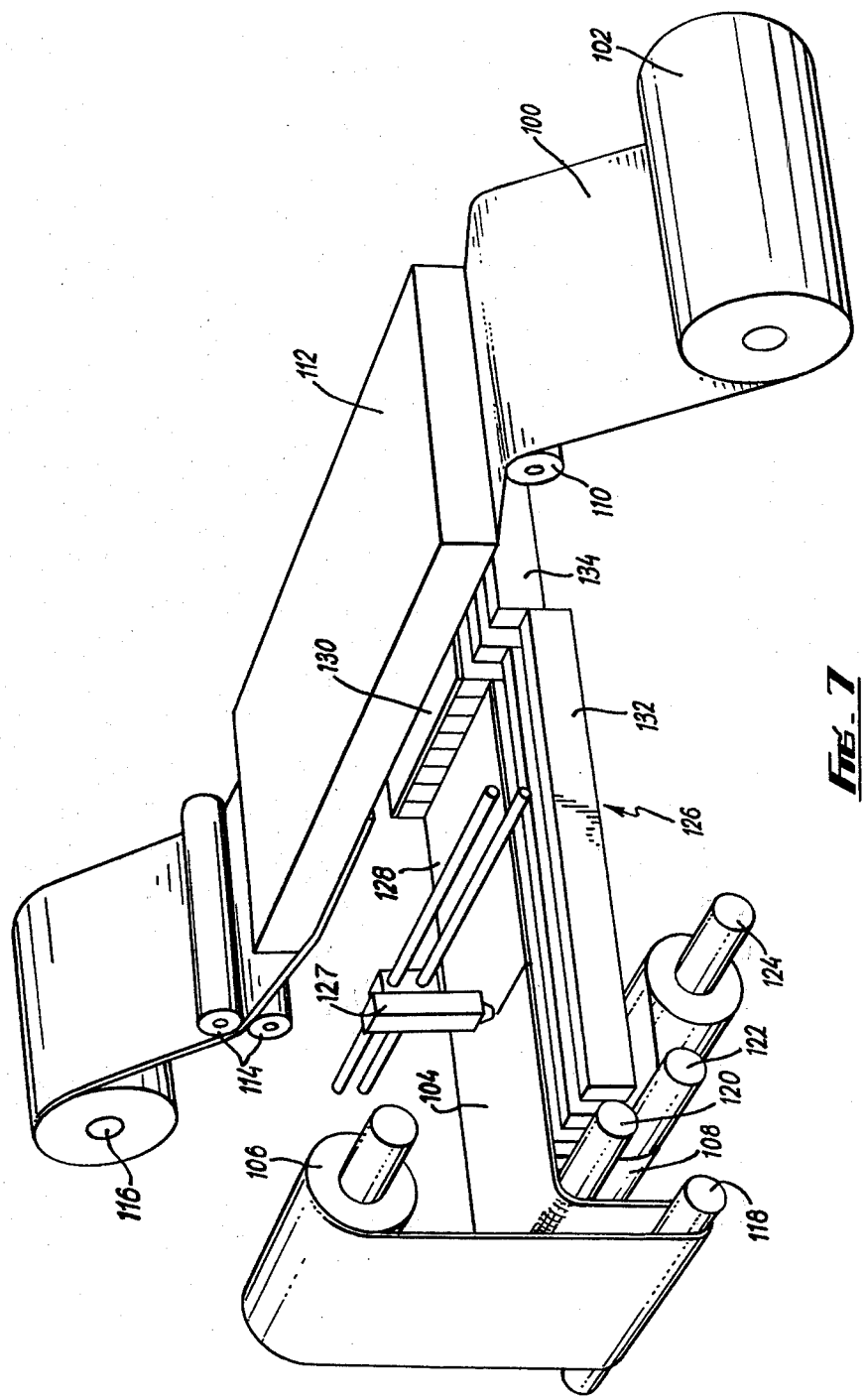

Alternatively, at each step, a length of web is fed beneath the stringers, and then a length above them, both being appropriately severed (see FIG. 6). Many other variations can readily be envisaged.

FIGS. 1 to 6 are intended to make clear the general principles of the invention. Although the mechanism shown diagrammatically in FIG. 2 has been described as operating to provide a length of radial fabric without overlapping of the successive pieces it will readily be understood that, if overlapping were desired, the operation of the mechanism could readily be modified in an appropriate manner.

In the description of the exemplary embodiments the filaments were said to lie at right angles to the longitudinal direction of the fabric piece. As earlier indicated however the filaments could in some fabrics according to the invention lie at an angle to that direction.

It is also feasible that the production of the latex-coated web 11 could be done continuously with the utilisation of the web to make the radial fabric, instead of collecting the web up on the roll 15 as an intermediate step.

Turning now to FIG. 7, the machine illustrated is fed with paper (or fabric) 100 from a roll 102 thereof. The lower surface of the paper 100 is coated with a layer of pressure-sensitive adhesive. It is also fed with a latex-coated web 104 of closely spaced parallel yarns from a roll 106 thereof. Interleaved with the web 104 is paper 108.

The paper 100 passes from the roll 102 over a roller 110, beneath a platen 112, between nip rollers 114, to a wind-up support 116. Back torque is applied to the shaft of roll 102 to keep the paper 100 taut as it passes over roller 110 and under platen 112. The nip rollers 114 control the motion of paper 100 which is wound-up on support 116 to which a forward torque is applied.

The web 104 together with the interleaved paper 108 passes under a dancer roller 118 and over a driven roller 120, where the paper 108 is stripped from the web 104 to pass under driven roller 122 and be rolled up on driven shaft 124. The web continues over a cutting table 126 where it is severed by means of a cutting head 127 into successive separate lengths 128, 130 and so on which pass beneath the platen 112 to be adhered in side-by-side disposition to the paper 100 to travel with the latter between the nip rollers 114 to the wind-up support 116. The movement of the web 104 and the paper 100 is suitably intermittent and will now be described in more detail.

The dancer roller 118 oscillates vertically between two limit switches (not shown) which control a drive motor (not shown) for the support shaft of roll 106 so that there is an accummulation of the web 104 and paper 108 under a known tension which will be equal to half the weight of the roller 118.

The cutting table 126 consists of two series of bars 132, 134. The one series 132 is fixed, whilst the second series 134 repeatedly perform an oscillatory movement to feed the successive lengths 128, 130, and so on, from the cutting table 126 under the platen 112, as will now be described.

In the drawing the various instrumentalities are at the point in the cycle where the web 104 is fully advanced over the cutting table 126 and is stationary as the cutting head 127 carrying a plasma torch moves transversely across it to sever the length 128. Simultaneously the series of bars 134 carrying the length 130 of the web 104 is rising, essentially to bring the length 130 into pressure contact with the underside of paper 100 to which it then adheres, in abutting relationship with the previously adhered length. When the severing and adhering steps are complete the series of bars 134 sinks back into line with the series of bars 132 whilst the paper 100 is moved forward by nip roller 114 until the trailing edge of the severed length 130 is in line with the far edge of the severed length 128. Both side edges of length 128 are sensed photoelectrically and their positions used to control the distance through which the paper is moved, so that accurate butt jointing of the successive severed lengths of web 104 is achieved.

The series of bars 134 move back into interdigitated position with the series 132 and then rise slightly to lift the web 104 before moving forward towards and beneath platen 112 through a distance equal to the width of the paper 100. Although the series of bars 134 define the distance moved by the web 104 the motion is assisted by the tractive effort derived from the power drive applied to rollers 120, 122, sequenced in phase with the forward motion of the series 134. At the end of the forward stroke the series 134 sink below the level of the series 132 and the web is replaced on the cutting table having been advanced one pitch nearer to the platen 112. The cycle then repeats.

Thus the continuous length of material wound up on support 116 consists of a succession of pieces of web 104, adhered side-by-side on paper 100 with the yarns of the web 104 lying at right-angles to the length of the material.

In order to make radial tyre fabric two or more rolls of such material are laminated by passing them together between pressure rollers and stripping off the carrier paper. Usually the butt joints in the successive laminations will be staggered, and a length of web like web 104 will be interposed between laminations. Eventually sufficient heat will be applied fully to vulcanise or cure the laminations.

The machine of FIG. 7 as illustrated and described lays the severed lengths of web 104, as has already been explained, with the yarns thereof lying at right angles to the longitudinal direction of the material as wound up. Clearly the machine could be modified, or made adjustable, so that the successive lengths of the web 104 are cut, and fed, on the bias, at any desired angle from 90° to 45°.

The nature of the webs and other components used in the foregoing embodiments of the invention will depend on circumstances. By way of example when using the machine illustrated in FIG. 7 for producing a ply for a hose fabric, the web may well consist of 24 ends per inch of continuous filament polyester 1100 decitex yarn, with up to 3 turns per inch of twist, in a matrix of natural latex containing chemical additives for vulcanisation, protection against ageing, and for tackifying. For producing a ply for a radial tyre fabric one suitable web would consist of 25 ends per inch, of 2-fold 1840 decitex rayon, 12 turns per inch in twist, and 12 turns per inch in cable, in a matrix of rubber with like additives. The "paper" could be of polyester film, 0.010 inches thick, coated on one side with a pressure-sensitive adhesive, such as that available from Bondmaster Limited of Slough, England, under the designation Type 80-1197, at approximately $30_g/M^2$. This particular adhesive has a high re-use value when brought into contact with a dried, but somewhat tacky, latex or rubber as described above.

FIG. 8 shows a machine capable of producing a two-ply radial fabric continuously.

A massive frame 200 carries means in each half for producing a radial tyre fabric ply and since the construction of the two halves is the same only the left hand half will be described.

Along the upper part of each half of the machine lies an endless carrier 202. This may be, say, of polyester film, coated on its external surface with Bondmaster adhesive previously referred to. Beneath the carrier 202 and extending from the frame 200 is mounted web feed means 204. The feed means 204 is carried on a turntable 206 and supports at its outer end, at a lower level, a roll 207 of latex-coated warp sheet 208 and extending along its length, at a higher level, an endless apron 210. At one end of the apron 210, at a higher level still, is a nip roller 212. The frame also carries a cutting head 214 and an anvil 216 (the actual means for supporting the anvil 216 is omitted in the interests of clarity).

Above the carrier 202 is a pressure roller 218 which is reciprocable under the influence of a hydraulic system 220.

As has already been pointed out the other half of the machine is constructed in the same manner but, for reasons which will become apparent, the corresponding feed means on the right hand half of the machine is at the other side of the frame.

The general mode of operation of the feed means 204, the cutting head 214 and anvil 216, the endless carrier 202, and the pressure roller 218 is like the operation of the machine illustrated in FIG. 7 in that the web of latex-coated warp sheet 208 is fed intermittently forward by the apron 210 is severed into successive lengths by the cutting head at the anvil location and the successive lengths pressed into contact with the adhesive surface of the carrier 202 by the action of the pressure roller 218. As a result the carrier 202 of the left half of the machine, moving anti-clockwise, has adhered thereto a succession of pieces of warp sheet, in abutting side-by-side relationship with the warps extending transversely but inclined with respect to the longitudinal direction of the carrier 202, if the web feed means 204 is itself inclined to make an angle of other than 90° with the frame by rotating it on its turntable.

At the upper central part of the frame are journalled five rotary members. Two are rollers 222, around which the respective carriers 202 pass; one is a wind-up support 224; one is a guide roll 226; and one is the shaft 228 of a roll of paper 229.

The two lengths of material being carried by the respective carriers 202 come together and are stripped therefrom on to the wind-up, interleaving and support paper 229 coming over guide roll 226 on to the wind-up at the same time. The two-ply fabric thus formed may be used as a radial tyre fabric or a ply for such a fabric.

If desired a further ply of suitable fabric could be introduced between the two lengths of material from a roll mounted in the lower central part of the machine.

It may be mentioned that for coating the warp sheet with latex a very suitable applicator is that described in co-pending application No. 46782/77 which comprises a slit-like passage through which the warp sheet can pass, the passage having an intermediate enlargement, and means for conducting latex to the enlargement.

Although, in the example described, the manufacture of radial fabric only has been involved, the invention is not only concerned with such fabrics. For instance, the assemblies of filamentary material could be simply lengths of any textile or other fabric. If a textile fabric, it could be woven, knitted, or otherwise fabricated, or fabric of the type known as "non-woven". It will be appreciated that, using various such assemblies of filamentary material, a wide variety of end products can be obtained, each having particular functional or decorative characteristics. In particular fabrics with selected physical characteristics may be made by virtue of the anisotropic nature of its plies.

I claim:

1. Apparatus for making a fabric in the piece comprising means for feeding a plurality of parallel filaments through a bath of coating material that surrounds the filaments and bonds them together to thereby form filamentary material in the form of a coherent web of parallel filaments, bonded together; means for repeatedly and intermittently feeding forward the filamentary material in the form of a coherent web of parallel filaments, bonded together; means for repeatedly and intermittently indexing a carrier comprising a plurality of parallel filaments transversely across the path of said filamentary material; means for severing given lengths of said filamentary material in synchronism with the intermittently indexed movements of said carrier; means for placing the severed given lengths of said filamentary material side-by-side in-line on said carrier with adjacent edges of adjacent severed given lengths abutting each other; and means for laminating said placed severed given lengths of said filamentary material with said carrier to produce a fabric in the piece comprising two plies of filamentary material with the filaments in one ply lying transversely to the filaments in the other ply and the plies being interconnected to each other by the material coating the parallel filaments.

2. Method of making a fabric in the piece comprising:
    feeding a plurality of filaments through a bath of coating material that surrounds the filaments and forms filamentary material in the form of a coherent web of parallel filaments bonded together;
    repeatedly and intermittently feeding forward the filamentary material in the form of a coherent web of parallel filaments bonded together;
    repeatedly and intermittently indexing a carrier comprising a plurality of parallel filaments transversely across the path of said filamentary material;
    severing given lengths of said filamentary material in synchronism with the intermittently indexed movements of said carrier;
    placing the severed given lengths of said filamentary material side-by-side in-line on said carrier with adjacent edges of adjacent severed given lengths abutting each other; and
    laminating said placed severed given lengths of said filamentary material with said carrier to produce a fabric in the piece comprising two plies of filamentary material with the filaments in one ply lying transversely to the filaments in the other ply.

3. Apparatus as claimed in claim 1 in which said length of filamentary material is fed forward at right angles to the direction of movement of said carrier and the given lengths are severed rectilinearly.

4. Apparatus as claimed in claim 1 in which said length of filamentary material is fed forward at an angle other than a right angle to the direction of movement of said carrier and the given lengths are severed correspondingly on the bias.

5. Apparatus as claimed in claim 1 comprising a feed mechanism having a first support for a roll of the filamentary material, a second support for material unwound from said first support, and a cutting head, traversable above and across said second support, a conveyor system disposed across the path of said feed mechanism and having a third support for the carrier, the carrier being in the form of a web, a wind-up, a platen between said third support and said wind-up, an oscillatory transporter for several lengths of filamentary material and movable back and forth between said second support and said platen and up and down between said second support and said platen, and synchronised drives adapted to advance said filamentary material along said second support, repeatedly and intermittently, to traverse said cutting head across said second support to sever the so advanced lengths of material to oscillate said transporter so as to carry each successive severed length of material from said second support to beneath said platen and there to press it into adhering contact with said carrier, and to advance said carrier, repeatedly and intermittently, to receive successive severed lengths of material in side-by-side in-line disposition before causing same to be passed to said wind-up.

6. Apparatus as claimed in claim 1 comprising a feed mechanism having a first support for a roll of filamentary material, a transporter for material unwound from said first support, and a cutting head traversable above and across said transporter, a conveyor system disposed across the path of said feed mechanism and including the carrier, the carrier being in the form of a web, a pressure member for bringing several lengths of material into contact with said carrier, synchronised drives adapted to operate said transporter, repeatedly and intermittently, to advance material unwound from said first support beneath said carrier, to traverse said cutting head across said transporter to sever successive lengths of material, and to operate said conveyor system and said pressure member, repeatedly and intermittently, so as to press each successive severed length of material into adhering contact with the surface of the carrier in side-by-side in-line disposition, and a wind-up for said so disposed lengths of material.

7. Apparatus as claimed in claim 5 in which the angularity of said feed mechanism with respect to said conveyor system is adjustable.

8. A method as claimed in claim 2, in which said material is fed forward at right angles to the direction of movement of said carrier and the given lengths are severed rectilinearly.

9. A method as claimed in claim 2, in which said material is fed forward at an angle other than a right angle to the direction of movement of said carrier and the given lengths are severed correspondingly on the bias.

10. A method as claimed in claim 2, comprising the further step of laminating such a continuous length of fabric in the piece with at least one other length of fabric comprising a flat web of parallel continuous filaments.

11. A method as claimed in claim 2, comprising the further step of laminating such a continuous length of fabric in the piece with at least one such length of fabric or ply, and at least one other length of fabric comprising a flat web of parallel continuous filaments.

12. A method as claimed in claim 2, in which, when at least two lengths of fabric are laminated together, points between adjacent given lengths in one length are staggered in relation to those in the other length.

13. Apparatus for making a fabric in the piece comprising: means for surrounding a plurality of parallel filaments with a bonding material that surrounds the filaments and bonds them together to thereby form filamentary material in the form of a coherent web of parallel filaments bonded together; means for repeatedly and intermittently feeding forward the filamentary material; means for repeatedly and intermittently indexing a carrier comprising a plurality of parallel filaments transversely across the path of said filamentary material; means for severing given lengths of said filamentary material in synchronism with the intermittently indexed movements of said carrier; means for placing the severed given lengths of said filamentary material side-by-side in-line on said carrier with adjacent edges of adjacent severed given lengths abutting each other; and means for laminating said placed severed given lengths of said filamentary material with said carrier to produce a fabric in the piece comprising two plies of filamentary material with the filaments in one ply lying transversely to the filaments in the other ply and the plies being interconnected to each other by the bonding material.

14. Method of making a fabric in the piece comprising:
- surrounding a plurality of filaments with a bonding material that surrounds the filaments and forms filamentary material in the form of a coherent web of parallel filaments bonded together;
- repeatedly and intermittently feeding forward the filamentary material;
- repeatedly and intermittently indexing a carrier comprising a plurality of parallel filaments transversely across the path of said filamentary material;
- severing given lengths of said filamentary material in synchronism with the intermittently indexed movements of said carrier;
- placing the severed given lengths of said filamentary material side-by-side in-line on said carrier with adjacent edges of adjacent severed given lengths abutting each other; and
- laminating said placed severed given lengths of said filamentary material with said carrier so that the bonding material interconnects the given lengths and carrier to produce a fabric in the piece comprising two plies of filamentary material with the filaments in one ply lying transversely to the filaments in the other ply.

15. A method as claimed in claim 2, in which the given lengths of filamentary material are severed from a web of warp yarns coated with a curable material, such as latex, and comprising the further step of curing same by applying heat and pressure.

* * * * *